F. GUNN.
TOOL OR APPLIANCE FOR USE IN MAKING JOINTS IN DRIVING BELTING.
APPLICATION FILED MAR. 8, 1913.
1,144,122.
Patented June 22, 1915.
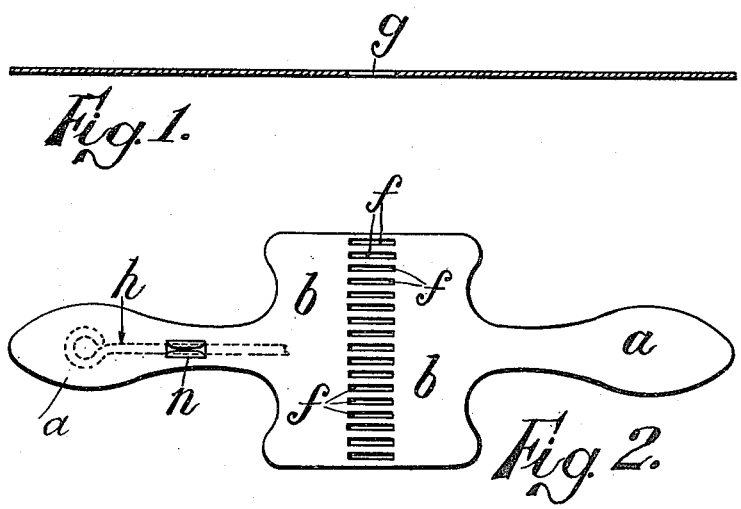

UNITED STATES PATENT OFFICE.

FRANCIS GUNN, OF REDDISH, ENGLAND.

TOOL OR APPLIANCE FOR USE IN MAKING JOINTS IN DRIVING-BELTING.

1,144,122.  Specification of Letters Patent.  Patented June 22, 1915.

Application filed March 8, 1913. Serial No. 752,965.

*To all whom it may concern:*

Be it known that I, FRANCIS GUNN, subject of the King of Great Britain and Ireland, and resident of Reddish, in the county of Lancaster, England, engineer, have invented a certain new and useful Improved Tool or Appliance for Use in Making Joints in Driving-Belting, of which the following is a specification.

My invention relates to an improved tool or appliance for use in connection with the making of joints in leather belting and the like for driving purposes of that class in which a number of hooks of V-shape in side elevation provided with inwardly bent pointed ends are secured in each end of the belt to be joined and the looped ends of the hooks afterward placed together and a joint pin passing through them to keep the joint intact.

In the drawings, Figure 1 is a longitudinal section through a tool constructed according to this invention, showing it before being bent double and finished. Fig. 2 is a plan view of the tool as shown in Fig. 1. Fig. 3 is an end view of the tool, showing it bent double to its finished form, but with the retaining pin and its clip omitted.

The tool is formed of a sheet of metal having a main portion $b$ at its middle part, and half handle portions $a$ projecting from its ends. The main portion $b$ has a series of parallel slots $f$ formed in it and arranged parallel to the half handle portions $a$. The plate is bent double so that the half handle portions $a$ come together, as shown in Fig. 3, and the metal between the slots $f$ is formed into a loop $g$. In using the tool the fastening hooks of the belt are placed in the slots $f$, and a retaining pin $h$ is placed in the loop $g$ to hold the hooks in place while their pointed portions are being driven into the belt.

The device is pressed out of one piece of metal or stamped at one operation including the perforations to form the slots $f$ and is afterward bent as previously stated. I have only indicated the portion of the metal plate forming the handles as being placed together flat but I would have it understood that the material may be dished so as to form a more rounded handle or for ornamental purposes, if desired. There may also be struck up from one of the handle portions $a$ lugs $n$ to act as a clip for supporting the pin $h$ longitudinally of the handle when the device is not in use, such an arrangement taking the place of the chain previously referred to.

What I claim is:

A holder for joint hooks formed of a metallic plate bent double and having a loop at one end portion and having at its other end portion two opposed half handles which together constitute the handle of the holder, the said loop being provided with a series of slots which form notches for receiving the joint hooks, and a retaining pin for the joint hooks which is slidable in the said loop and which retains the joint hooks in the notches.

In testimony whereof I have hereunto set my hand in the presence of two witnesses.

FRANCIS GUNN.

Witnesses:
 AMY EVELINE EVINS,
 WILLIAM M. TAYLOR.

Copies of this patent may be obtained for five cents each, by addressing the "Commissioner of Patents, Washington, D. C."